United States Patent
Hog et al.

(10) Patent No.: US 11,195,288 B2
(45) Date of Patent: Dec. 7, 2021

(54) METHOD FOR PROCESSING A LIGHT FIELD VIDEO BASED ON THE USE OF A SUPER-RAYS REPRESENTATION

(71) Applicant: InterDigital CE Patent Holdings, Paris (FR)

(72) Inventors: Matthieu Hog, Cesson-Sevigne (FR); Neus Sabater, Cesson-Sevigne (FR); Christine Guillemot, Rennes (FR)

(73) Assignee: InterDigital CE Patent Holdings, SAS, Paris (FR)

( * ) Notice: Subject to any disclaimer, the term of this patent is extended or adjusted under 35 U.S.C. 154(b) by 0 days.

(21) Appl. No.: 16/764,040

(22) PCT Filed: Nov. 13, 2018

(86) PCT No.: PCT/EP2018/081080
§ 371 (c)(1),
(2) Date: May 14, 2020

(87) PCT Pub. No.: WO2019/096789
PCT Pub. Date: May 23, 2019

(65) Prior Publication Data
US 2020/0279379 A1     Sep. 3, 2020

(30) Foreign Application Priority Data

Nov. 15, 2017   (EP) ..................... 17306585

(51) Int. Cl.
*G06T 7/00* (2017.01)
*G06T 7/246* (2017.01)
*G06T 7/90* (2017.01)

(52) U.S. Cl.
CPC ................ *G06T 7/248* (2017.01); *G06T 7/90* (2017.01); *G06T 2207/10016* (2013.01); *G06T 2207/10052* (2013.01)

(58) Field of Classification Search
CPC ............. G06T 2207/10052; G06T 7/11; G06T 2200/21; G06T 2207/10016; H04N 19/597; H04N 2013/0081; H04N 2013/0092
See application file for complete search history.

(56) References Cited

FOREIGN PATENT DOCUMENTS

| CN | 102109532 A | 6/2011 |
|---|---|---|
| CN | 105913070 A | 8/2016 |

(Continued)

OTHER PUBLICATIONS

Chang, Jason, Donglai Wei, and John W. Fisher. "A video representation using temporal superpixels." Proceedings of the IEEE Conference on Computer Vision and Pattern Recognition. 2013.*

(Continued)

*Primary Examiner* — Li Liu
(74) *Attorney, Agent, or Firm* — Condo Roccia Koptiw LLP

(57) ABSTRACT

A method and device for processing a light field video is described. The light field video includes a set of image views per unit of time, the light field video being associated with a scene without cuts. In the method a first super-rays representation of reference image views at a given time is determined based on centroids. A second super-rays representation associated with corresponding views of a subsequent set of image views is next determined based on de-projection and re-projection of centroids. The displacement of centroids between the first and second super-rays is determined and then the determined displacement is applied to centroids of the second super-rays representation.

14 Claims, 10 Drawing Sheets

(56) References Cited

FOREIGN PATENT DOCUMENTS

EP 3113479 A1 1/2017
KR 101723738 B1 4/2017

OTHER PUBLICATIONS

Dąbała, Łukasz, et al. "Efficient Multi-image Correspondences for On-line Light Field Video Processing." Computer Graphics Forum. vol. 35. No. 7. 2016.*
Achanta et al., "SLIC Superpixels Compared to State-of-the-art Superpixel Methods", Journal of Latex Class Files, vol. 6, No. 1, Dec. 2011, pp. 1-8.
Reso et al., "Temporally Consistent Superpixels", IEEE international Conference on Computer Vision, Sydney, Australia, Dec. 1, 2013, pp. 385-392.
Weinzaepfel et al., "DeepFlow: Large displacement optical flow with deep matching", IEEE International Conference on Computer Vision, Sydney, Australia, Dec. 1, 2013, 8 pages.
Fracastoro et al., "Superpixel-Driven Graph Transform for Image Compression", 2015 IEEE International Conference on Image Processing (ICIP), Quebec City, Canada, Sep. 27, 2015, pp. 2631-2635.
Mihara et al., "4D Light Field Segmentation with Spatial and Angular Consistencies", IEEE International Conference on Computational Photography (ICCP), Evanston, Illinois, USA, May 13, 2016, 8 pages.
Hog et al., "Superrays for Efficient Light Field Processing", IEEE Journal of Selected Topics in Signal Processing, vol. 11, Issue 7, Oct. 2017, pp. 1187-1199.
Giraud et al., "Superpixel-based Color Transfer", Giraud, Remi, Vinh-Thong Ta, and Nicolas Papadakis, IEEE International Conference on Image Processing (ICIP). Beijing, China, Sep. 17, 2017, 5 pages.
Revaud, et al., "DeepMatching: Hierarchical Deformable Dense Matching", International Journal of Computer Vision, vol. 120, Oct. 8, 2015, pp. 1-22.
Thewlis, et al., "Fully-Trainable Deep Matching", Department of Engineering Science, University of Oxford, Oxford, UK, Sep. 12, 2016, pp. 1-12.
Zhu, et al., "4D Light Field Superpixel and Segmentation", 2017 IEEE Conference on Computer Vision and Pattern Recognition, DOI 10.1109/CVPR 2017.710, 2017, pp. 6709-6717.

* cited by examiner

Algorithm 1: super-ray algorithm

Data: Input Light Field $LF$
Result: Super-ray assignments $A$
Initialize centroids on reference view;
while *not (converged OR max. iteration reached)* do
    \\ Assignment step
    for *each centroid $c$* do
        for *each view $(s', t')$* do
            Compute $(x'_c, y'_c) = \mathcal{P}^{d_c}_{s', t'}(x_c, y_c)$;
            for *each ray $r$ in $\mathcal{N}_S(r'_c)$* do
                $A(r) = c$ ($c$ minimizing $A(r) = \arg\min_c \left( \Delta_{Lab}(r, r_c) + m\, \Delta_{xy}(r, r'_c) \right)$ );
    \\ Update step
    for *each centroid $c$* do
        Compute $\mathcal{P}^{d_c}_{s_c, t_c}(x, y)$, $\forall r \in SR_c$;
        Update $Lab_c$ and $(x_c, y_c)$
Cleanup step

FIG.2

Algorithm : Dynamic super-ray algorithm

Data: Input Light Field Frame $LF^f$
Result: Super-ray assignments $A^f$
if $f ==$ *first frame* then
$\quad$ Compute $A^f$
else
$\quad$ Move centroids with $(\delta_c^x, \delta_c^y, \delta_c^d)$
$\quad$ Delete and create centroid
$\quad$ for *5 iterations* do
$\quad\quad$ Do the assignment step
$\quad\quad$ Do the update $$(x_c^{f+1}, y_c^{f+1}) = p' \cdot \frac{1}{|SR_c^{f+1}|}\bigg|_{r \in SR_c^{f+1}} \sum \left(\mathcal{P}_{s_c}^{d_c}(x_r^f), \mathcal{P}_{t_c}^{d_c}(y_r^f)\right)$$
$$+ (1-p) * (x_c^f + \delta_c^x, y_c^f + \delta_c^y)$$

FIG.5(b)

METHOD FOR PROCESSING A LIGHT FIELD VIDEO BASED ON THE USE OF A SUPER-RAYS REPRESENTATION

This application claims the benefit, under 35 U.S.C. § 365 of International Application PCT/EP2018/081080, filed Nov. 13, 2018, which was published in accordance with PCT Article 21(2) on May 23, 2019, in English, and which claims the benefit of European Patent Application No. 17306585.5, filed Nov. 15, 2017.

TECHNICAL FIELD

The disclosure relates to a technique for processing a light field video. More precisely, it concerns a technique for easing the editing of content within a light field video, as well as the handling of a light field video.

BACKGROUND

This section is intended to introduce the reader to various aspects of art, which may be related to various aspects of the present invention that are described and/or claimed below. This discussion is believed to be helpful in providing the reader with background information to facilitate a better understanding of the various aspects of the present invention. Accordingly, it should be understood that these statements are to be read in this light, and not as admissions of prior art.

Light field images (either obtained or acquired via a plenoptic camera or via a camera array) provides more features to end-users. Indeed, the processing of light field images enables the refocusing feature, as well the change of point of view, or also the change of the field of view of a scene. Due to these offered possibilities, manufacturers of mobile devices (such as tablet, or mobile phones) begin to propose mobile devices that integrate several cameras (i.e. a cameras array) for acquiring light field images.

As detailed in the article entitled "*Super-rays for Efficient Light Field Processing*" by Matthieu Hog, Neus Sabater and Christine Guillemot, published in the IEEE journal of selected topics in signal processing, it is possible to segment a light field image (being represented by a set of images that are associated with different angular positions) via the use of super-rays. These super-rays can be viewed as the equivalents or counterparts of the super-pixels used for segmenting classical or conventional images. The processing for obtaining a super-rays representation is inspired by the SLIC method (that was presented in the article entitled "*SLIC superpixels compared to state-of-the-art superpixel methods*" by Achanta, Radhakrishna, et al., published in the IEEE transactions on pattern analysis and machine intelligence 34.11 (2012) 2274-2282) which is considered as the state-of-the-art for super-pixel computation in a static image. More precisely, the SLIC approach can be viewed as a reformulation of the k-means problem on each pixel color and spatial position, including a compactness prior on the distribution of each cluster centroid. In addition, the SLIC method uses the Loyd's algorithm with a bounded search window S to reduce the complexity.

Once a light field image is converted into a super-rays representation (see for example the FIGS. 7(*b*) and 8(*b*) of the previously mentioned article, that present super-rays representation), it is easier to edit such content especially for removing or inserting objects in the scene.

However, in the case that a light field video is acquired by an acquisition device, in the case that a super-rays representation has to be obtained for editing some frames (i.e. a frame being a light field image) or sequences of the light field video, then one skilled in the art would have used the method described in the previously mentioned article for processing each frame in the same way during a selected or identified period of time. However, this approach will not guarantee temporal consistency.

In a variant, one skilled in the art would have used instead of the super-ray representation, the super-pixels approach. For example, one skilled in the art could have used the technique described in the article entitled "*Temporally consistent superpixels*" by Reso, Matthias, et al., published in the proceedings of the IEEE International Conference on Computer Vision 2013, in which dynamic SLIC super-pixels are computed in a sliding window of 20 frames. A dense flow is used to propagate the assignment form a frame to another and several SLIC iterations are run. Only the centroid color is shared between pixels. The super-pixel list update criterion is solely based on the super pixel size. However, such approach suffers from different drawbacks: it requires the loading of the entire video sequence or a big window to memory, which is prohibitive in the case of a light field video; it is limited to densely sampled videos; and it is not suitable for a GPU implementation, necessary to handle the large volume of data. However, this approach will not guarantee angular consistence.

The present technique proposes an alternative to these approaches, and at least overcomes one of the identified drawbacks.

SUMMARY OF THE DISCLOSURE

References in the specification to "one embodiment", "an embodiment", "an example embodiment", indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

In one embodiment of the disclosure, it is proposed a method for processing a light field video comprising a set of image views per unit of time, the light field video being associated with a scene without cuts. The method is remarkable in that it comprises:

determining a first super-rays representation of at least one reference image view being comprised in said set of image views at a given time, said super-rays representation being based on centroids, and each centroid being associated with a unique super-ray;

determining a second super-rays representation of at least one corresponding reference view in a subsequent set of image views following said given time, based on a de-projection and re-projection of centroids of said at least one reference image view;

determining a displacement of centroids between said first and second super-rays representation based on a tracking process;

applying a determined displacement on centroids of said second super-rays representation for obtaining positions of modified centroids.

Hence, the proposed technique provides a way of dealing temporally consistent super-rays for light field videos.

Although one should notice that the proposed technique can also be used for other media (e.g. RGB-D or multi-views plus depth videos).

It should be noted that the tracking process can be either a minimization process or the use of a function that was obtained via deep matching techniques (see for example the article entitled "*DeepFlow: Large displacement optical flow with deep matching*" by Philippe Weinzaepfel et al., or the article entitled "*Fully-Trainable Deep Matching*" by James Thewlis et al.).

Obviously, a light field video can comprise cuts (for example a change of view). However, the present method can be applied only to a set of frames of said light field video in which no cuts occur.

In a preferred embodiment, the method for processing further comprises de-projecting and re-projecting of modified centroids onto at least one another image view in said subsequent set of image views, for obtaining a super-rays representation of said subsequent set of image views.

In a preferred embodiment, the method for processing further comprises updating the position of said centroids by taking into account an average of values of projected rays, said rays being in a neighborhood of centroids in said first super-rays representation.

In a preferred embodiment, the method for processing is remarkable in that said tracking process is a minimization process that comprises the determination of $\mathrm{argmin}_{\delta_c^x, \delta_c^y, \delta_c^z} \Sigma_{s,t} \| RGB^f(P_{s,t}{}^{d_c}(x_c^f, y_c^f)) - RGB^{f+1}(P_{s,t}{}^{d_c+\delta_c^d}(x_c^f + \delta_c^x, y_c^f + \delta_c^y)) \|^\beta$, where $RGB^f(P_{s,t}{}^d(x,y))$ corresponds to the RGB pixel value of the projection of a ray r of coordinates (s, t, x, y) at a depth d, associated with a frame f.

In a preferred embodiment, the method for processing is remarkable in that at least two reference images views are used, and said at least two reference image views are far from each other's from an angular point of view.

In a preferred embodiment, the method for processing is remarkable in that said light field video has been acquired by a cameras array.

In a preferred embodiment, the method for processing is remarkable in that said light field video has been acquired by a plenoptic camera.

According to an exemplary implementation, the different steps of the previous mentioned methods are implemented by a computer software program or programs, this software program comprising software instructions designed to be executed by a data processor of a relay module according to the disclosure and being designed to control the execution of the different steps of this method.

Consequently, an aspect of the disclosure also concerns a program liable to be executed by a computer or by a data processor, this program comprising instructions to command the execution of the steps of a method as mentioned here above.

This program can use any programming language whatsoever and be in the form of a source code, object code or code that is intermediate between source code and object code, such as in a partially compiled form or in any other desirable form.

The disclosure also concerns an information medium readable by a data processor and comprising instructions of a program as mentioned here above.

The information medium can be any entity or device capable of storing the program. For example, the medium can comprise a storage means such as a ROM (which stands for "Read Only Memory"), for example a CD-ROM (which stands for "Compact Disc-Read Only Memory") or a microelectronic circuit ROM or again a magnetic recording means, for example a floppy disk or a hard disk drive.

Furthermore, the information medium may be a transmissible carrier such as an electrical or optical signal that can be conveyed through an electrical or optical cable, by radio or by other means. The program can be especially downloaded into an Internet-type network.

Alternately, the information medium can be an integrated circuit into which the program is incorporated, the circuit being adapted to executing or being used in the execution of the method in question.

According to one embodiment, an embodiment of the disclosure is implemented by means of modules comprising software and/or hardware components. From this viewpoint, the term "module" can correspond in this document both to a software component and to a hardware component or to a set of hardware and software components.

A software component corresponds to one or more computer programs, one or more sub-programs of a program, or more generally to any element of a program or a software program capable of implementing a function or a set of functions according to what is described here below for the module concerned. One such software component is executed by a data processor of a physical entity (terminal, server, etc.) and is capable of accessing the hardware resources of this physical entity (memories, recording media, communications buses, input/output electronic boards, user interfaces, etc.).

Similarly, a hardware component corresponds to any element of a hardware unit capable of implementing a function or a set of functions according to what is described here below for the module concerned. It may be a programmable hardware component or a component with an integrated circuit for the execution of software, for example an integrated circuit, a smart card, a memory card, an electronic board for executing firmware etc. In a variant, the hardware component comprises a processor that is an integrated circuit such as a central processing unit, and/or a microprocessor, and/or an Application-specific integrated circuit (ASIC), and/or an Application-specific instruction-set processor (ASIP), and/or a graphics processing unit (GPU), and/or a physics processing unit (PPU), and/or a digital signal processor (DSP), and/or an image processor, and/or a coprocessor, and/or a floating-point unit, and/or a network processor, and/or an audio processor, and/or a multi-core processor. Moreover, the hardware component can also comprise a baseband processor (comprising for example memory units, and a firmware) and/or radio electronic circuits (that can comprise antennas) which receive or transmit radio signals. In one embodiment, the hardware component is compliant with one or more standards such as ISO/IEC 18092/ECMA-340, ISO/IEC 21481/ECMA-352, GSMA, StoLPaN, ETSI/SCP (Smart Card Platform), GlobalPlatform (i.e. a secure element). In a variant, the hardware component is a Radio-frequency identification (RFID) tag. In one embodiment, a hardware component comprises circuits that enable Bluetooth communications, and/or Wi-fi communications, and/or Zigbee communications, and/or USB communications and/or Firewire communications and/or NFC (for Near Field) communications.

It should also be noted that a step of obtaining an element/value in the present document can be viewed either as a step of reading such element/value in a memory unit of an electronic device or a step of receiving such element/value from another electronic device via communication means.

In a variant, it is proposed an electronic device for processing a light field video comprising a set of image views per unit of time, the light field video being associated with a scene without cuts. The electronic device comprises at least one processor, and a memory unit coupled to said at least one processor, the processor is configured to:

determine a first super-rays representation of at least one reference image view being comprised in said set of image views at a given time, said super-rays representation being based on centroids, and each centroid being associated with a unique super-ray;

determine a second super-rays representation of at least one corresponding reference view in a subsequent set of image views following said given time, based on a de-projection and re-projection of centroids of said at least one reference image view;

determine a displacement of centroids between said first and second super-rays representation based on a tracking process;

apply a determined displacement on centroids of said second super-rays representation for obtaining positions of modified centroids.

BRIEF DESCRIPTION OF THE DRAWINGS

The above and other aspects of the invention will become more apparent by the following detailed description of exemplary embodiments thereof with reference to the attached drawings in which:

FIG. 2 presents the flowchart of FIG. 1 as an algorithm;

FIG. 5(b) presents the steps of the method for determining a super-rays representation of a light field video, described as an algorithm, in one embodiment of the disclosure;

DETAILED DESCRIPTION

Figure 1:
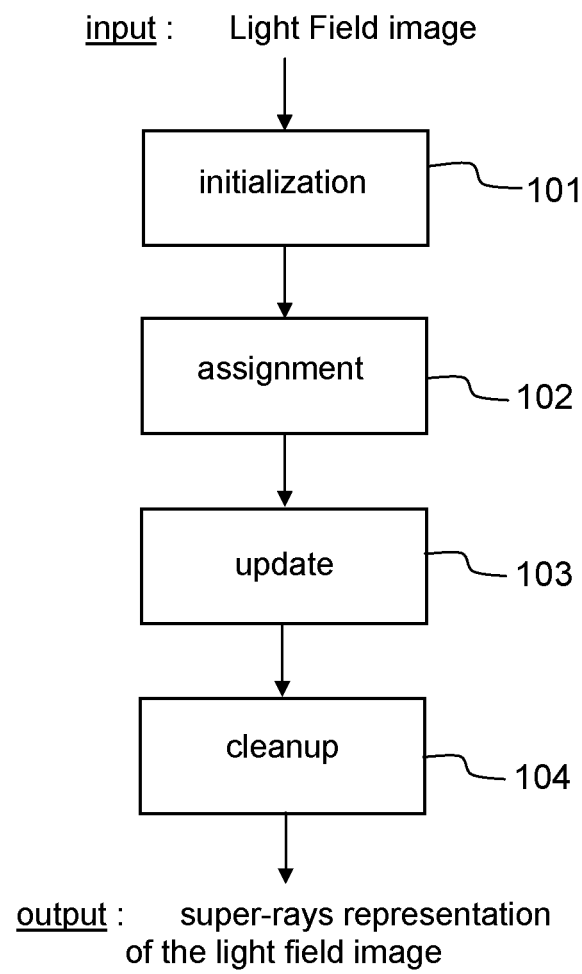
FIG. 1 presents a flowchart corresponding to the main steps that are executed for determining a super-rays representation for a given frame.

FIG. 1 presents a flowchart corresponding to the main steps that are executed for determining a super-rays representation for a given frame (being a set of image views). Such given frame belongs to a sequence of a light field video, and the given frame is considered at the first frame (or close to the first frame) in such sequence. The other frames in the sequence are going to be processed differently for obtaining a super-rays representation.

The purpose of processing described in FIG. 1 is to determine a super-rays representation of the image views comprised in the given frame. For reminders, a super-ray is described by its centroid ray $r_c$. Therefore, by definition, all the light-rays in a Super-Ray of centroid r, are labeled c. Now, a centroid light ray $r_c$ at the given frame $f_0$ is represented by four coordinates (the reference view $s_0$, $t_0$ coordinates and spatial coordinates $x_c^{f_0}, y_c^{f_0}$) and a disparity value $d_c^{f_0}$. Each centroid ray is initialized with a color $Lab_c^{f_0}$ (initialised with the reference view color). Let us explain more precisely how the super-rays are estimated on the given frame:

In a step referenced 101, an electronic device performs an initialization step. More precisely, in one embodiment of the disclosure, it is proposed to use the central view as a reference and seed the spatial coordinates of the centroids on a regular grid of step S. The sparse depth for each seed is supposed to be known or it can be computed with any well-known method of the state-of-the-art.

Then, in a step referenced 102, the electronic device performs an assignment step. More precisely, the electronic device determines the ray centroid projection on each image view, using the estimated depth $d_c$, and assign the same label of the centroid ray c to the pixels in a small window of the projection pixel having similar color and small distance.

Formally, we denote $P_{s',t'}^{d}(r)$ the spatial coordinates of the projection of a ray r of coordinates $(s_r, t_r, y_r^{f_0}, y_r^{f_0})$ and depth d to another view (s', t'):

$$P_{s',t'}^{d}(r) = (d(s_r - s') + x_r^{f_0}, d(t_r - t') + y_r^{f_0}).$$

It should be noted that the equation above stands for a light-field with rectified views but generalize to the case of unrectified views using the calibration parameters.

If $\Delta_{Lab}$ and $\Delta_{xy}$ denote respectively the Lab color difference and the spatial Euclidean distance, $N_{S \times S}$ denote the S×S window around a pixel and m a parameter balancing importance of color versus spatial compactness, then the assignment step 102 can be summarized as the determination of a label for each ray r, that is associated with a centroid (i.e. rays are grouped according to centroids):

$$A(r) = \underset{c}{\operatorname{argmin}} \{\Delta_{Lab}(r_c, r) + m \cdot \Delta_{xy}(P_{s_r,t_r}^{d_c}(r_c), r) \mid r \in N_{S \times S}(P_{s_r,t_r}^{d_c}(r_c))\}$$

Doing so, we establish a correspondence, not only for light rays similar in appearance in one view, but also for light rays captured in all the views that are similar in appearance and likely to come from the same scene point. It should be noted that the S×S window around a pixel can range from 10×10 pixels to 100×100 pixels depending on the image resolution.

Then, in a step referenced 103, the electronic device performs an update step. More precisely, the new color of each super-ray is determined by averaging the color values of all light-rays having the same label. The new position of the centroid in the reference view is obtained averaging the projected coordinates on the reference view of all light-rays having the same label:

$$Lab_c = \operatorname{mean}(Lab_r), xy_c = \operatorname{mean}(P_{s_0,t_0}^{d_c}(r))$$

$$\forall r \mid A(r) = c.$$

When the centroid positions are not changed or modified, or a maximum number of iterations is reached, the iterative process stops. In one embodiment of the disclosure, it is proposed to use a number of iterations equal to 10.

In addition, in a facultative step referenced 104, the electronic device can perform a cleanup step. Indeed, similarly to the SLIC method, the execution of steps 101 to 103 does not enforce super-ray spatial connectivity. Therefore, after the grouping of rays around centroids, some rays may remain isolated, especially when the spatial term in the equation $$A(r) = \underset{c}{\mathrm{argmin}}\{\Delta_{Lab}(r_c, r) + m \cdot \Delta_{xy}(P_{s_r,t_r}^{d_c}(r_c), r) \mid r \in N_{S \times S}(P_{s_r,t_r}^{d_c}(r_c))\}$$

has a low weight. Hence, the electronic device can perform in step 104 a simple post-processing method that comprises the re-labeling of super-ray disconnected components (with a number of pixels below a value of $1/4S^2$) with the closest super-ray label.

FIG. 2 presents the flowchart of FIG. 1 as an algorithm.

Figure 3A:
FIG. 3(a) presents a light field image corresponding to a set of 9 images.
Figure 3B:
FIG. 3(b) presents the image view which is the upper-left image view in the set of images views presented in FIG. 3(a)
Figure 3C:
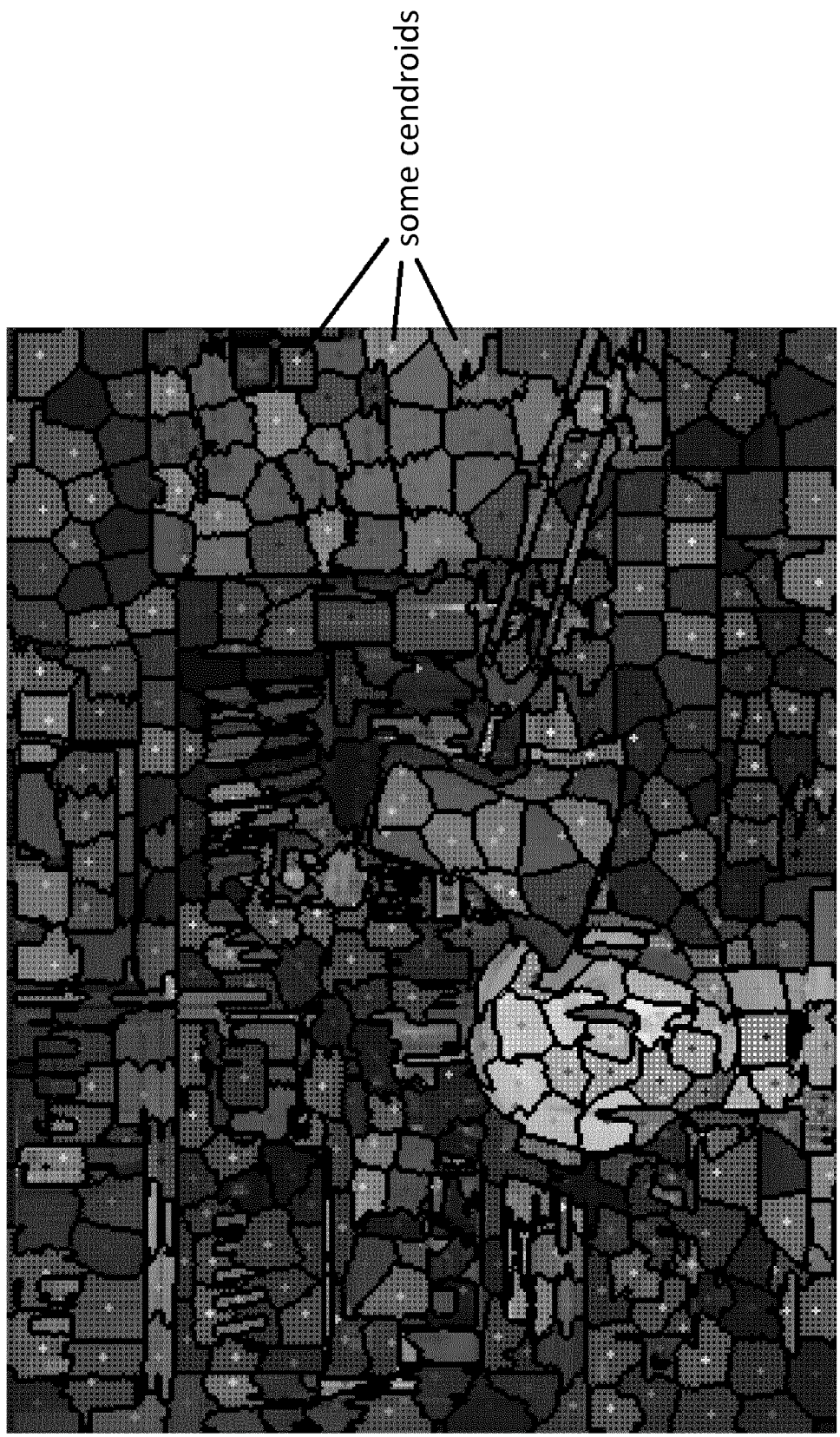
FIG. 3(c) presents a super-rays representation of the image view presented in FIG. 3(b), when the process of FIG. 1 or 2 is applied on the light field image of the FIG. 3(a)

FIG. 3(*a*) presents a light field image corresponding to a set of 9 images.

FIG. 3(*b*) presents the image view which is the upper-left image view in the set of images views presented in FIG. 3(*a*).

FIG. 3(*c*) presents a super-rays representation of the image view presented in FIG. 3(*b*), when the process of FIG. 1 or 2 is applied on the light field image of the FIG. 3(*a*).

It should be noted that some "area" associated with a super-rays seem to have more than one centroid (see for example on the lamp). However, the centroids presented in FIG. 3(*c*) corresponds to the superposition of all the centroids from all the image views of FIG. 3(*a*) (i.e. a kind of map of all the determined centroids from all the image views).

It should be noted that super-rays representation can be obtained via other technique. Indeed, in a broader interpretation, it is proposed, in another embodiment of the disclosure, to assimilate or define a super-rays representation of a light-field image as a segmented representation of a light-field image obtained via other techniques consisting in gathering rays from the light field image into groups of rays, or in assigning labels associated with groups of rays from the light field image. Then, centroids (or geometric centers) are determined once the segmentation of the light field image has been done.

Figure 4A:
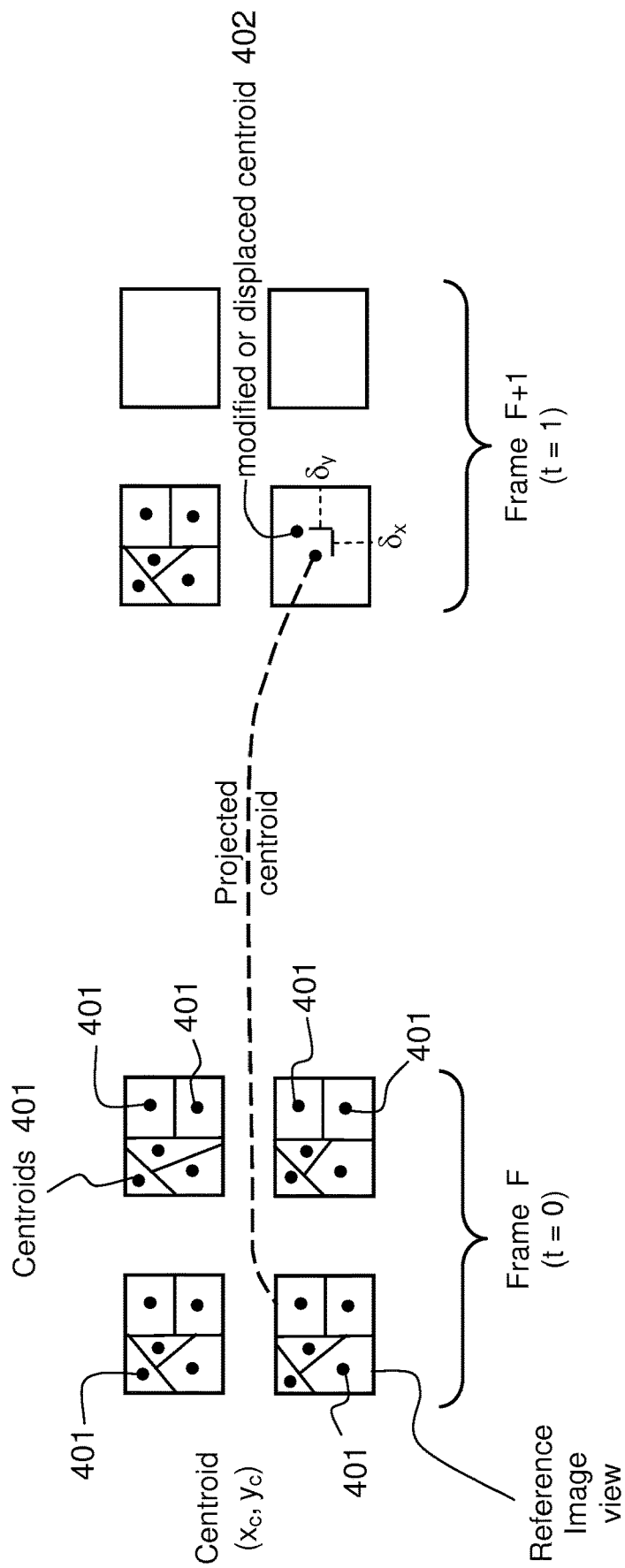
FIG. 4(a) presents in a schematic way a method for determining a super-rays representation of a light field video.

Indeed, it is necessary to define centroids in order to implement the technique described in FIGS. 4 to 5. For example, by applying the technique described in the article entitled "*4D Light Field SuperPixel and Segmentation*" by Zhu et al. published in Computer Vision and Pattern Recognition (CVPR) 2017, it is possible to obtain Light Field super-pixels with an EPI representation. Then, after the execution of a conversion process for obtaining the resulting segmentation of a light-field image represented as a matrix of image views, the centroids are determined.

In a variant, other techniques used for determining super-pixels can be adapted for obtaining super-rays representation. Indeed, it is possible to modify these techniques by taking into account the strong correlation between the image views. The output of these adapted techniques is still named as a super-rays representation in the following.

In the following, we focus on the determination of a super-rays representation of a sequence of frames within a light field video. For example, the sequence of frames comprises N frames to be processed, and each frame being associated with a matrix of image views.

In one embodiment of the disclosure, an electronic device performs for the first frame f the determination of a super-rays representation based on the process depicted in FIGS. 1 and 2. Then, for a subsequent frame f+1, according to one embodiment of the disclosure, it is proposed to take into account the movement of objects in the scene for determining the super-rays representation of the subsequent frame.

In one embodiment of the disclosure, the electronic device determines the displacement in x, y and d, noted $\delta_c^x, \delta_c^y, \delta_c^z$, of each centroid ray, for a reference view between frames f and f+1. This problem is known as scene flow, or in our case sparse scene flow.

The electronic device can solve such problem by searching for the vector $\delta_c^x, \delta_c^y, \delta_c^z$ that minimizes the color distance in a patch around each centroid: $(\delta_c^x, \delta_c^y, \delta_c^z) = \mathrm{argmin}_{\delta_c^x, \delta_c^y, \delta_c^z} \Sigma_{s,t} \|RGB^f(P_{s,t}^{d_c}(x_c^f, y_c^f)) - RGB^{f+1}(P_{s,t}^{d_c + \delta_c^z}(x_c^f + \delta_c^x, y_c^f + \delta_c^y))\|^\beta$ where $RGB^f$ is the color value at a frame f and $\|\cdot\|^\beta$ denotes the sum of squared difference in a patch of size B. Hence, according to such approach, the centroids of all the images views in the frame f+1 are determined by applying to all of the centroids of all image views in the frame f, the corresponding set of displacement vectors (i.e. the vectors $\delta_c^x, \delta_c^y, \delta_c^z$ associated with a given centroid) previously determined.

In another embodiment of the disclosure, it is proposed to split the search into a x, y displacement search on only a reference image view, along with an update of the depth value. The reference view can be the central image view or another chosen image view.

In another embodiment, $\delta_c^z$ can be determined using a block-matching technique, and $\delta_c^x, \delta_c^y$ can be determined computed using Deep Match as described in the document entitled "*Deepmatching: Hierarchical deformable dense matching*" by Revaud et al. published in International Journal of Computer Vision 120(3): 300-323, 201t.

FIG. 4(*a*) presents in a schematic way a method for determining a super-rays representation of a light field video. The frame f that comprises 4 image views of a scene, at a given time (t=0). After having applied the method or process depicted in FIG. 1 or FIG. 2 on the frame f, a super-rays representation is obtained, and each super-ray is associated with a centroid (the centroids referenced 401 in the FIG. 4). Then, a reference image view is selected in the frame f. The reference image view can be a central image view in one embodiment of the disclosure. Then, the centroids of the reference image are projected on the corresponding image view in a subsequent frame (the frame f+1, for a time t=1), and a vector $\delta_c^x, \delta_c^y, \delta_c^z$ is determined according to the previous described method. For example, the centroid with coordinates $(x_c^f, y_c^f)$ in the reference image view is projected in the corresponding image view in the frame f+1, and the displacement vector $\delta_c^x, \delta_c^y, \delta_c^z$ is determined, enabling to determine a modified centroid 402. Each centroid of the reference image view is associated with its own displacement vector $\delta_c^x, \delta_c^y, \delta_c^z$.

Then, in one embodiment of the disclosure, once the modified centroids 402 within the equivalent of the reference image view in the frame f+1 are obtained, the electronic device performs a de-projection and re-projection method (as accurate values of the modified centroids 402 in depth are obtained from the value $z_c^f$ and $\delta_c^z$) onto the other image views of the frame f+1. In one embodiment of the disclosure, the projection/deprojection function can be the function $P_{s',t'}^d(r)$ previously mentioned. For an arbitrary camera-array geometry, the standard epipolar geometry relationship (described in the chapter 11 of the document entitled "Computer Vision: Algorithms and Applications" by Richard Szeliski) can be used for performing the de-projection and re-projection method.

In a variant, instead of using only one reference image view between the frame f and f+1, it is proposed to use several reference image views. Such embodiment is of interest when occlusions in a scene occurs. It should be noted that in the case that, for a given image view, centroids coming from the re-projection/de-projection process from centroids of reference image views of apparently a same super-rays do not exactly coincide, it is proposed to define a unique centroid as being positioned at the middle of each segment that links the coordinates (according to x, y or z axis) of these close centroids.

In one embodiment of the disclosure, it is proposed to use two reference images views that are far from each other (in term of angular distance) within the matrix or set of image views.

It should be noted that once the centroids at frame f+1 have been initialized or determined via the previous mentioned technique, in one embodiment of the disclosure, the electronic device performs an update step 103. In a variant, the electronic device also performs a clean-up stage 104 on the image views of the frame f+1.

Figure 4B:
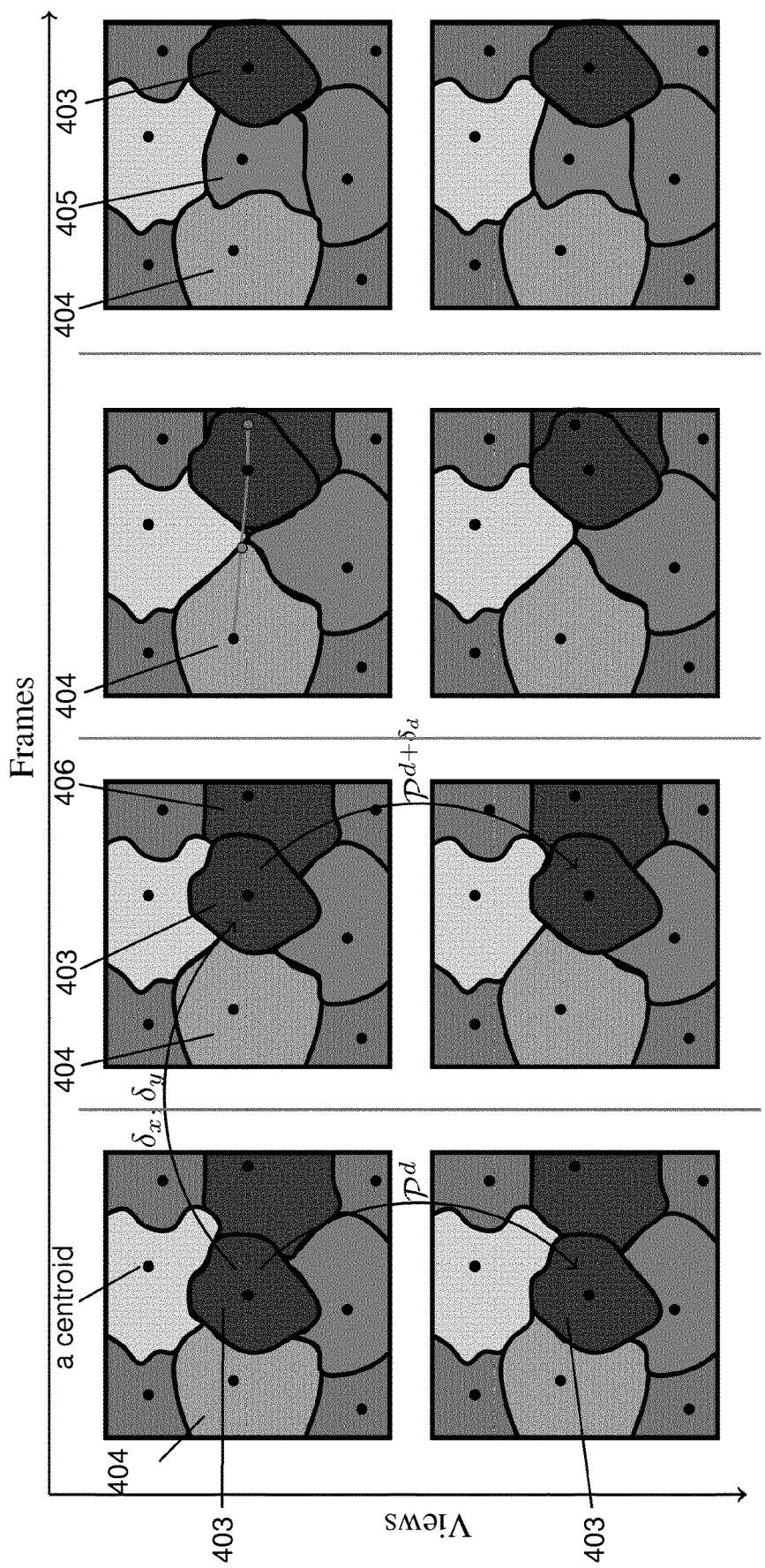
FIG. 4(b) presents an illustration of the execution of the method for determining a super-rays representation of a light field video according to one embodiment of the disclosure.

FIG. 4(b) presents an illustration of the execution of the method for determining a super-rays representation of a light field video according to one embodiment of the disclosure.

More precisely, the foreground super-ray referenced 403 is tracked over the consecutive frames of a 2×1 light field images. Other super-rays do not move since the background is static. The depth d is used to enforce angular consistency from a view to another, while the scene flow $\delta_x$, $\delta_y$ guarantees temporal consistency. On Frame 3, the moving super-ray 403 becomes too close of the super-ray referenced 406, and too far from the super-ray referenced 404, triggering the creation of the super-ray referenced 405, and the deletion of the super-ray referenced 406.

It should be noted that in order to cope with the low-frame rates of the current light field camera array, giving large object displacement on the sensor, a feature matching technique as described in the article entitled "*DeepFlow: Large displacement optical flow with deep matching*" by Weinzaepfel, Philippe, et al, published in the proceedings of the IEEE International Conference on Computer Vision, 2013, can be used. Such approach can be efficiently implemented on a GPU processor. A list a correspondence is obtained at a scale N (in our case N=3) from on the views $s_0$ $t_0$ between f and f+1. With such approach, the electronic device can obtain a set M of matches m with coordinates [$(x_m^f, y_m^f)$, $(x_m^{f+1}, y_m^{f+1})$]. Then, in order to determine the value for each centroid and avoid noisy or wrong matches, a trilateral filter using color, spatial and matching confidence to assign a displacement value for each super-ray centroid can be used:

$$(\delta_c^x, \delta_c^y) = \frac{1}{W} \sum_{m \in M} \exp\left(-\frac{\left\|\begin{array}{c}(x_m^f, y_m^f), \\ (c_x^f, c_y^f)\end{array}\right\|^{\wedge 2}}{\sigma_{xy}} - \frac{\left\|\begin{array}{c}Lab^f(x_m^f, y_m^f), \\ Lab^f(c_x^f, c_y^f)\end{array}\right\|^{\wedge 2}}{\sigma_{Lab}} - \frac{C_m}{\sigma_m}\right) \cdot (x_m^{f+1} - x_m^f)$$

With $$W = \sum_{m \in M} \exp\left(-\frac{\left\|\begin{array}{c}(x_m^f, y_m^f), \\ (c_x^f, c_y^f)\end{array}\right\|^{\wedge 2}}{\sigma_{xy}} - \frac{\left\|\begin{array}{c}Lab^f(x_m^f, y_m^f), \\ Lab^f(c_x^f, c_y^f)\end{array}\right\|^{\wedge 2}}{\sigma_{Lab}} - \frac{C_m}{\sigma_m}\right),$$

$C_m$ the confidence value of a match and $\sigma_{xy}$, $\sigma_{Lab}$, $\sigma_m$ tree parameters to control the importance of each term. It should be noted that the depth is updated by searching in a small window the depth value that minimizes the color distance $$\delta_c^z = \mathrm{argmin}_{\delta_c^z} \Sigma_{s,t} \| RGB^f(P_{s,t}^{d_c}(x_c^f, y_c^f)) - RGB^{f+1}(P_{s,t}^{d_c + \delta_c^d}(x_c^f + \delta_c^x, y_c^f + \delta_c^y)) \|^\beta$$

Then, once each centroid is displaced on a subsequent frame, a new round of assignment and update is run as proposed in the article entitled "*Temporally consistent superpixels*" by Reso, Matthias, et al., published in the proceedings of the IEEE International Conference on Computer Vision. 2013.

However, the technique of Reso et al. is interested in object segmentation and not so much in having superpixels that are temporally consistent. If we want the super rays to be consistent form a frame to another, we must prevent the centroids to move too much from their position after the update. In other words, super-rays belonging to static parts of the scene should not move in time. To do so we run 5 iterations of the assignment step 102 followed by a modified update step. The modified update step uses the position of the centroid after the move with the flow to limit the centroid displacement:

$$(x_m^{f+1}, y_m^{f+1}) = (1-p) \cdot \mathrm{mean}(P_{s_0, t_0}^{d_c}(r)) + p \cdot (x_c^f + \delta_c^x, y_c^f + \delta_c^y)$$

$$\forall r | A(r) = c.$$

The parameter p allows to control how much the previous centroids position matter in the computation of the new one. In the case when p=0, the update step 103, when p=1, the centroids are prohibited from moving after the flow propagation.

In a variant, it is proposed to determine the following:

$$(x_c^{f+1}, y_c^{f+1}) = p' \cdot \frac{1}{|SR_c^{f+1}|} \sum_{r \in SR_c^{f+1}} \left(P_{sc}^{d_c}(x_r^f), P_{tc}^{d_c}(y_r^f)\right) + (1-p') \cdot (x_c^f + \delta_c^x, y_c^f + \delta_c^y)$$

where p' is also a parameter that controls how much the super-rays are allowed to move from their theoretical position. When p'=1, this step corresponds to the same SLIC iteration. Newly created centroids from the step described previously always have p'=1, allowing them to adapt to the scene changes. When p'=0, the super-rays centroids are not allowed to move at all, providing the best consistency.

Because occlusion, deformable objects, or object entering or leaving the scene, the tracking of a super-ray can be lost from a frame to another. To cope with this, we leverage the depth information provided by our super-rays with the following strategy.

Figure 5A:
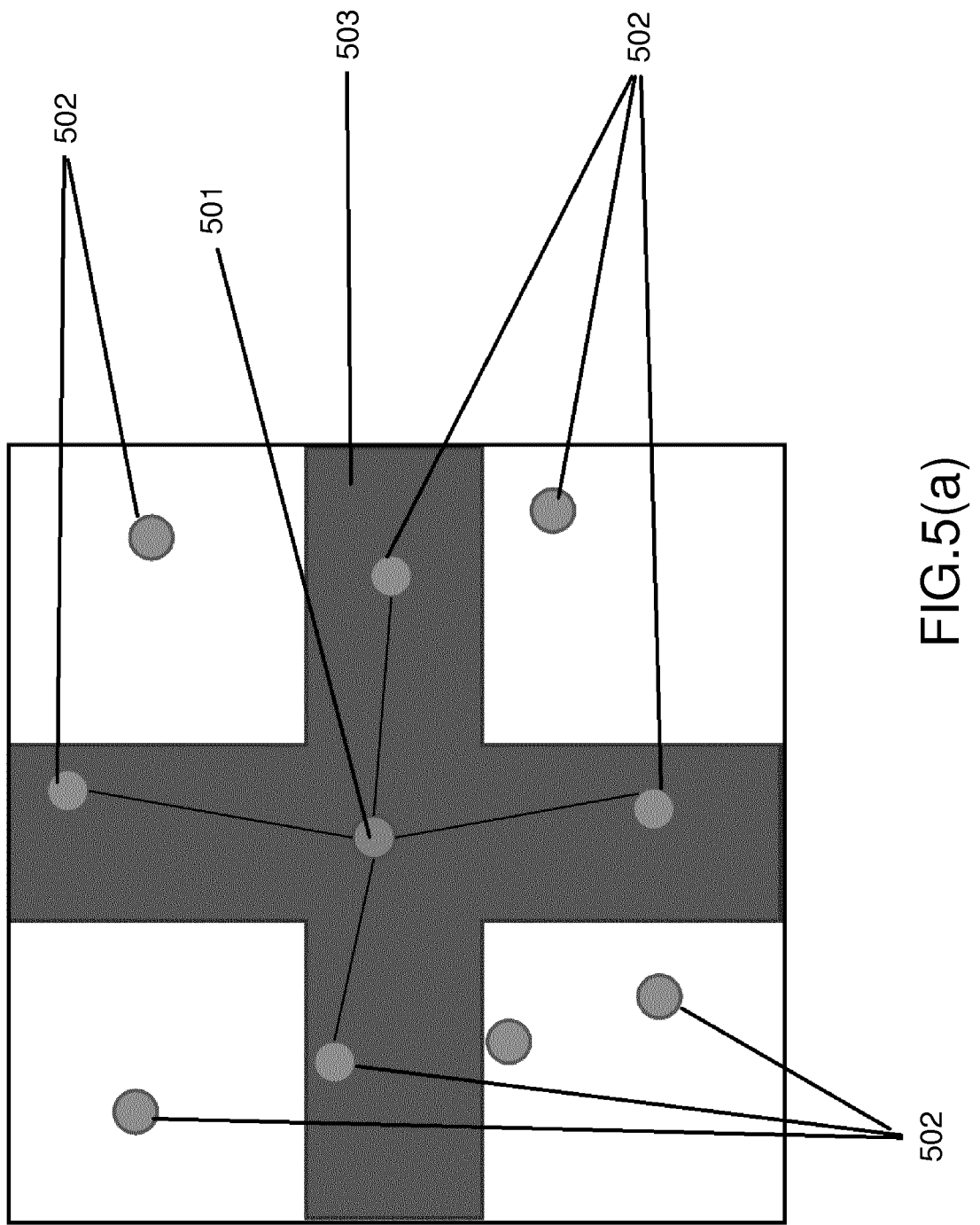
FIG. 5(a) presents a search zone for an approximate neighborhood used in the method for determining a super-rays representation of a light field video, according to one embodiment of the disclosure.

We begin to compute an approximate right, left, up and down neighborhood for each centroid, as illustrated in FIG. 5(a). Indeed, FIG. 5(a) presents a search zone for our approximate neighborhood in which the selected centroid is referenced 501 and potential neighborhoods are referenced 502. The dark zone (with a cross shape) referenced 503 illustrates the cardinal points search area M.

Let $M^{up}(c_1)$, $M^{down}(c_1)$, $M^{left}(c_1)$, $M^{right}(c_1)$ be the list of centroids that lies around the 4 cardinal axis of a centroid of index $c_1$, e.g $$M^{left}(c_1)=\{c_2 | x_{c_2} < x_{c_1} \text{ and } |y_{c_2}-y_{c_1}| < S\}$$

Where S the size of a superpixel.

The approximate neighborhood of a centroid is $N(c)=\{N^{up}(c_1), N^{down}(c_1), N^{left}(c_1), N^{right}(c_1)\}$ with $$N^{left}(c_1)=\operatorname{argmin}_{c_2 \in M^{up}} |y_{c_1}-y_{c_2}|$$

To decide which centroid to update, we use the following new rules based of the spatial and color distance and the depth:

If a centroid becomes to close from it neighborhood, the one centroid which is 'behind', i.e. with the largest assigned depth $d^c$ it is placed on a list of centroids to delete.

If a centroid is too far from one of its neighborhood, both centroids are placed on the list of centroids that will be used for creating a new centroid at the middle of the two centroids.

At the end of the search, a number k equal to the greatest number of element in either of the list of centroids are deleted and created.

The depth of the created super-rays is recomputed from scratch or using the depth value of its neighborhood;

The centroid that have been created are updated using p=0 to allow them to move to adapt to potential contours.

The approach has been tested on synthetic and real data. We saw that the centroids are in fact consistent from a frame to another, and still consistent from a view to another.

Because super-rays offer a temporally and angularly consistent representation of the light fields, it is easy to imagine how it can be used to reduce the size of a light field video, in the context of image compression.

For instance, in the article entitled "*Superpixel-driven graph transform for image compression*", by Fracastoro, Giulia, et al, published in the Image Processing (ICIP), 2015 IEEE International Conference on. IEEE, 2015. it is proposed a technique that uses graph-based Fourier transform computed for clusters of super pixel to encode a single image. The encoded segments and the coefficient are then transmitted, outperforming the DCT both in term of quality and bitrate. Is it not hard to image this gain multiplies if a single transform can be used for segments between views and frames.

Another possible application leverages the depth of each centroid. Indeed, supposing we want to insert an object of a light field into another light field (video or static), segmenting the object as in the article entitled "*Super-rays for Efficient Light Field Processing*". The depth of the centroid can be used as a z-buffer to decide which pixel to render on each view. Additionally, if color or style transfer needs to be run to homogenize the two light fields, super-rays can be used to guaranty the angular and temporal consistency of the transfer (for example, in the article entitled "*Superpixel-based Color Transfer*" by Giraud, Remi, Vinh-Thong Ta, and Nicolas Papadakis, published in IEEE International Conference on Image Processing (ICIP), 2017, it is proposed a super-pixel based color transfer, we can imagine having a single color transform by dynamic (or static) super ray to avoid temporal or angular flickering).

FIG. 5(b) presents the steps of the method for determining a super-rays representation of a light field video, described as an algorithm, in one embodiment of the disclosure.

Indeed, it is proposed to process the first frame of a sequence of a light field frames (being a part of a light field video) as in the article entitled "*Super-rays for Efficient Light Field Processing*".

Then, the centroids are moved by using determined movement vectors $\delta_c^x, \delta_c^y, \delta_c^z$.

Then, because of object movements in the scene, parts of the super-rays can be occluded and disoccluded or enter and leave the light field. For this reason, creating or deleting super-rays might be necessary. While the superpixel size or color consistency has been used to determine the creation or deletion in other research works, we propose to leverage the depth information associated to the super-ray to detect occlusions and disocclusions.

At last, to take into account non-rigid deformation and super-ray partial occlusion, the segmentation needs to be updated to fit the new frame.

In the article "*Temporally consistent superpixels*" by M. Reso, J. Jachalsky, B. Rosenhahn, and J. Ostermann, published in Proceedings of the IEEE International Conference on Computer Vision, pages 385-392, 2013, five SLIC iterations are run, where the centroids are allowed to move freely. This has for consequence that superpixels of static objects, that should not change are affected by the creation, deletion and movements of nearby superpixels. To compensate for this, we enforce the super-pixel centroids to take into account its position prior to the k-means iteration.

Figure 6:
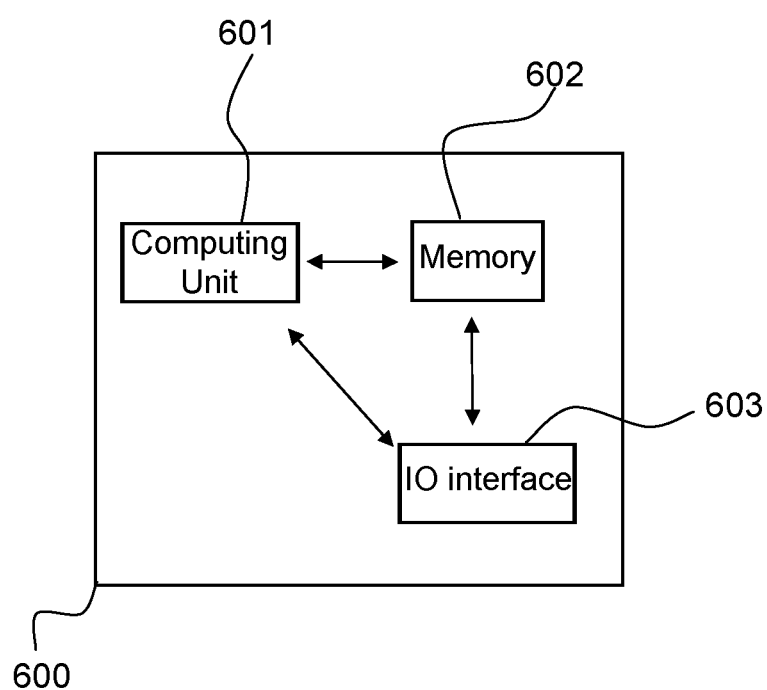
FIG. 6 presents an example of a device that can execute a process according to one embodiment of the disclosure.

FIG. 6 presents an example of an electronic device that can be used to perform one or several steps of methods disclosed in the present document.

Such electronic device referenced 600 comprises a computing unit (for example a CPU, for "Central Processing Unit"), referenced 601, and one or more memory units (for example a RAM (for "Random Access Memory") block in which intermediate results can be stored temporarily during the execution of instructions a computer program, or a ROM block in which, among other things, computer programs are stored, or an EEPROM ("Electrically-Erasable Programmable Read-Only Memory") block, or a flash block) referenced 602. Computer programs are made of instructions that can be executed by the computing unit. Such electronic device 600 can also comprise a dedicated unit, referenced 603, constituting an input-output interface to allow the device 600 to communicate with other electronic devices. In particular, this dedicated unit 603 can be connected with an antenna (in order to perform communication without contacts), or with serial ports (to carry communications "contact"). It should be noted that the arrows in FIG. 6 signify that the linked unit can exchange data through buses for example together.

In an alternative embodiment, some or all of the steps of the method previously described, can be implemented in hardware in a programmable FPGA ("Field Programmable Gate Array") component or ASIC ("Application-Specific Integrated Circuit") component.

In an alternative embodiment, some or all of the steps of the method previously described, can be executed on an electronic device comprising memory units and processing units as the one disclosed in the FIG. 6.

In one embodiment of the disclosure, the electronic device depicted in FIG. 6 can be comprised in a camera device that is configured to capture images (either conventional 2D images or a sampling of a light field). These images are stored on one or more memory units. Hence, these images can be viewed as bit stream data (i.e. a sequence of bits). Obviously, a bit stream can also be converted on byte stream and vice versa.

The invention claimed is:

1. A method comprising:
obtaining a light field video comprising a set of image views per unit of time, the light field video being associated with a scene without cuts;
determining a first super-rays representation of at least one reference image view being comprised in said set of image views at a given time, said super-rays representation being based on centroids, and each centroid being associated with a unique super-ray;
determining a second super-rays representation of at least one corresponding reference view in a subsequent set of image views following said given time, based on a de-projection and re-projection of centroids of said at least one reference image view;
determining a displacement of centroids between said first and second super-rays representation based on a tracking process; and
applying a determined displacement on centroids of said second super-rays representation for obtaining positions of modified centroids.

2. The method for processing according to claim 1, wherein it further comprises de-projecting and re-projecting of modified centroids onto at least one another image view in said subsequent set of image views, for obtaining a super-rays representation of said subsequent set of image views.

3. The method for processing according to claim 2, wherein it further comprises updating the position of said centroids by taking into account an average of values of projected rays, said rays being in a neighborhood of centroids in said first super-rays representation.

4. The method for processing according to claim 1, wherein said tracking process is a minimization process that comprises the determination of $\operatorname{argmin}_{\delta_c^x,\delta_c^y,\delta_c^z} \Sigma_{s,t} \|RGB^f(P_{s,t}^{d_c}(x_c^f,y_c^f)) - RGB^{f+1}(P_{s,t}^{d_c+\delta_c^d}(x_c^f+\delta_c^x,y_c^f+\delta_c^y))\|^B$, where $RGB^f(P_{s,t}^d(x,y))$ corresponds to the RGB pixel value of the projection of a ray r of coordinates (s, t, x, y) at a depth d, associated with a frame f.

5. The method for processing according to claim 1, wherein at least two reference images views are used, and said at least two reference image views are far from each other's from an angular point of view.

6. The method for processing according to claim 1, wherein said light field video has been acquired by a cameras array.

7. The method for processing according to claim 1, wherein said light field video has been acquired by a plenoptic camera.

8. An electronic device comprising at least one processor, and a memory unit coupled to said at least one processor, the at least one processor being configured to:

obtain a light field video comprising a set of image views per unit of time, the light field video being associated with a scene without cuts;
determine a first super-rays representation of at least one reference image view being comprised in said set of image views at a given time, said super-rays representation being based on centroids, and each centroid being associated with a unique super-ray;
determine a second super-rays representation of at least one corresponding reference view in a subsequent set of image views following said given time, based on a de-projection and re-projection of centroids of said at least one reference image view;
determine a displacement of centroids between said first and second super-rays representation based on a tracking process; and
apply a determined displacement on centroids of said second super-rays representation for obtaining positions of modified centroids.

9. The electronic device for processing according to claim 8, wherein the at least one processor is further configured to de-project and re-project modified centroids onto at least one another image view in said subsequent set of image views, for obtaining a super-rays representation of said subsequent set of image views.

10. The electronic device for processing according to claim 9, wherein the at least one processor is further configured to update the position of said centroids by taking into account an average of values of projected rays, said rays being in a neighborhood of centroids in said first super-rays representation.

11. The electronic device for processing according to claim 8, wherein said tracking process is a minimization process that comprises the determination of $\operatorname{argmin}_{\delta_c^x,\delta_c^y,\delta_c^z} \Sigma_{s,t} \|RGB^f(P_{s,t}^{d_c}(x_c^f,y_c^f)) - RGB^{f+1}(P_{s,t}^{d_c+\delta_c^d}(x_c^f+\delta_c^x,y_c^f+\delta_c^y))\|^B$, where $RGB^f(P_{s,t}^d(x,y))$ corresponds to the RGB pixel value of the projection of a ray r of coordinates (s, t, x, y) at a depth d, associated with a frame f.

12. The electronic device for processing according to claim 8, wherein at least two reference images views are used, and said at least two reference image views are far from each other's from an angular point of view.

13. The electronic device for processing according to any claim 8, wherein said light field video has been acquired by a cameras array.

14. The electronic device for processing according to any claim 8, wherein said light field video has been acquired by a plenoptic camera.

* * * * *